Feb. 9, 1960  D. J. FINK  2,924,420
ANTI-VIBRATION MOUNT
Filed July 7, 1958  4 Sheets-Sheet 1

Inventor
Daniel J. Fink
by Roberts, Cushman & Grover
Attys

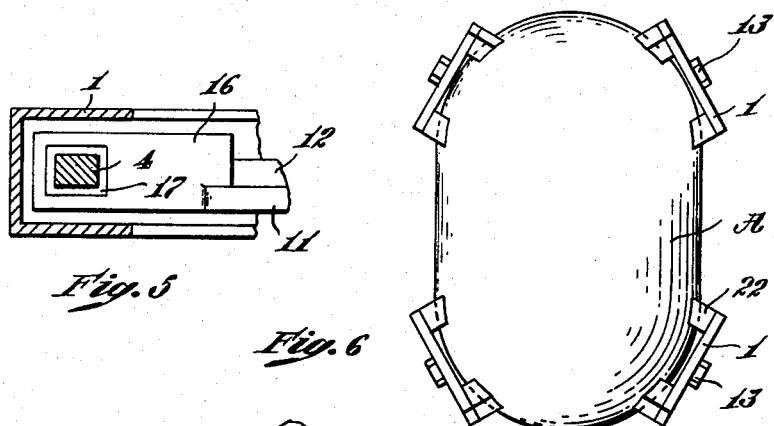
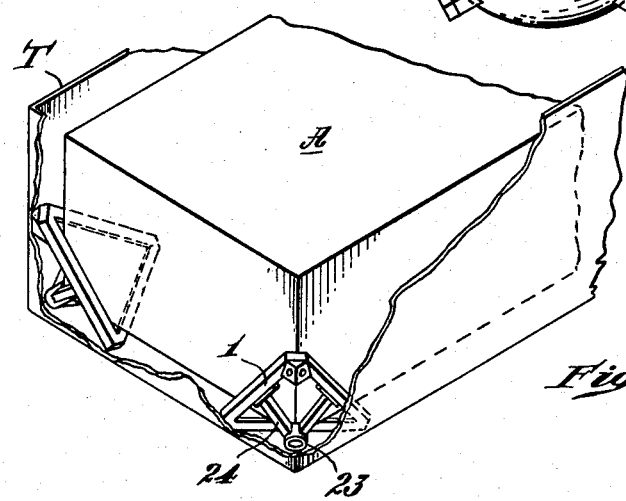
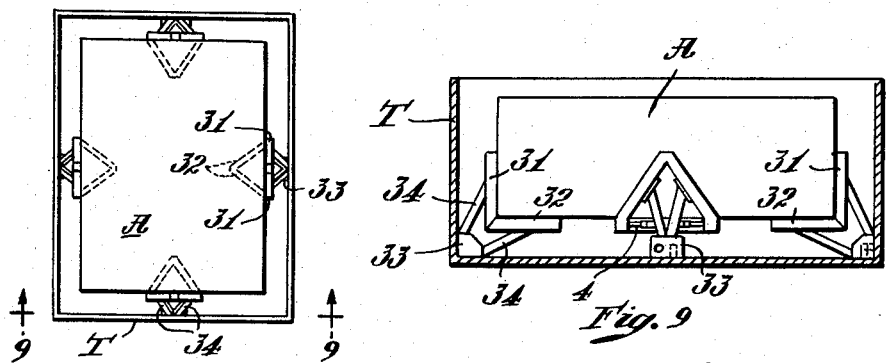

Feb. 9, 1960 D. J. FINK 2,924,420
ANTI-VIBRATION MOUNT
Filed July 7, 1958 4 Sheets-Sheet 3

Inventor
Daniel J. Fink
by Roberts, Cushman & Grover
Attorneys

United States Patent Office 2,924,420
Patented Feb. 9, 1960

2,924,420

ANTI-VIBRATION MOUNT

Daniel J. Fink, Lexington, Mass., assignor to Allied Research Associates, Inc., Boston, Mass., a corporation of Massachusetts Application July 7, 1958, Serial No. 746,923

8 Claims. (Cl. 248—358)

In many cases it is desirable to prevent the transmission of vibration from one part to another, usually from a support such as an airplane to apparatus such as a delicate instrument but sometimes vice versa, that is from vibrating apparatus to its support. Most of the prior mounts have been effective primarily in a single direction so that their utility is very limited. The few multi-directional mounts have been bulky, with their three dimensions approximately equal, and they have not been equally effective in all directions.

Objects of this invention are to provide an anti-oscillation mount which is effective in all directions, which is compact, which can have one dimension much smaller than the other two so as to fit in a space of limited height or width, which has optimum damping characteristics such that the damping forces increase with deflection, thereby preventing divergent amplitude increases at resonance, which has finite torsional stiffness for all angles of rotation about a central axis, which has a high degree of returnability to normal position, which is equally suited to deck, bulkhead or overhead installation, and the design of which is equally applicable for use with light or heavy articles.

According to the present invention the anti-vibration mount comprises two supports for engagement with a base and an article to be mounted on the base respectively, in combination with a beam connected to one of the supports, the other support being slidably connected to the beam for relative sliding movement lengthwise of the beam, and means to dampen the aforesaid movement. Preferably both ends of the beam are connected to the one support and the other support is connected to the beam intermediate the two ends. The connection between the aforesaid ends of the beam and the support should permit the end of the beam to incline in response to flexure of the beam. Preferably there are a plurality of beams connected to the aforesaid support in approximately the same plane so that vibration in any direction is resiliently resisted and damped. While any desired number of beams may be employed in non-parallel formation, preferably there are three beams in triangular relationship.

For the purpose of illustration typical embodiments of the invention are shown in the accompanying drawings in which Fig. 1 is a plan view of a triangular mount with parts broken away and parts in section;

Fig. 5 is a section on line 5—5 of Fig. 1;

Fig. 6 is a side view illustrating one method of use;

Fig. 7 is an isometric view with parts broken away showing a modified mount and illustrating a different method of use;

Fig. 8 is a plan view of another modification;

Fig. 9 is a section on line 9—9 of Fig. 8;

Figure 15:
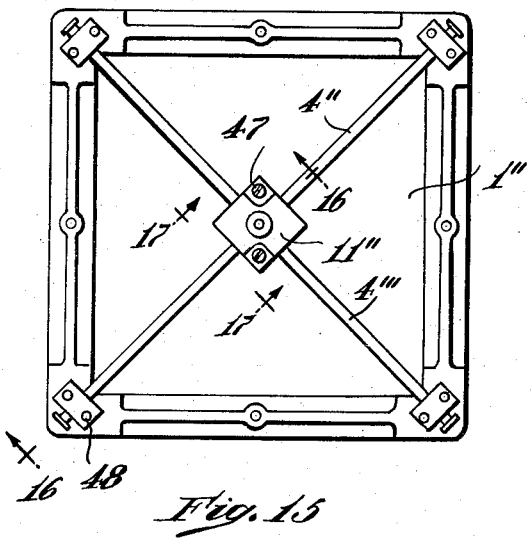
Fig. 15 is a similar view of a cross or X embodiment.
Figure 16:
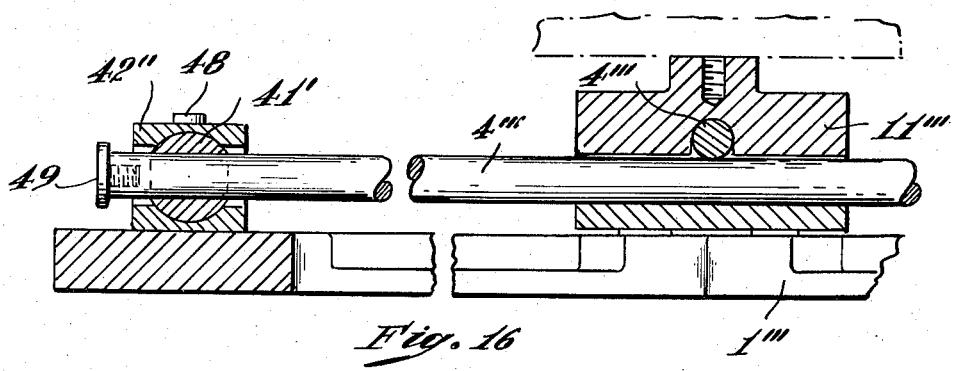
Figure 17:
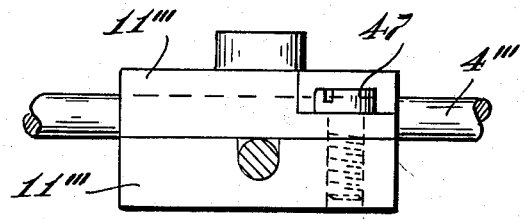

Figs. 16 and 17 are sections on lines 16—16 and 17—17 respectively of Fig. 15.

Figure 1:
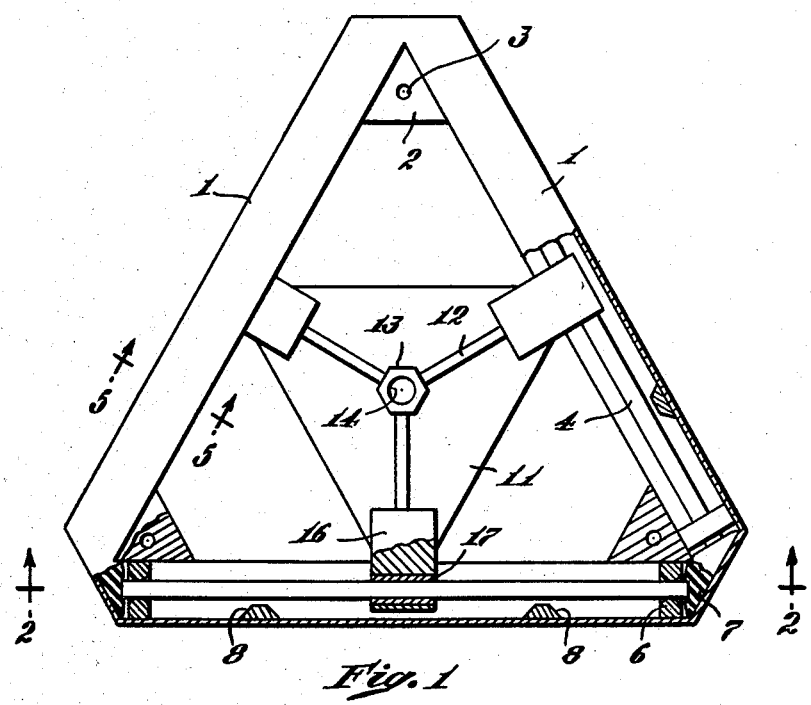
Figure 2:
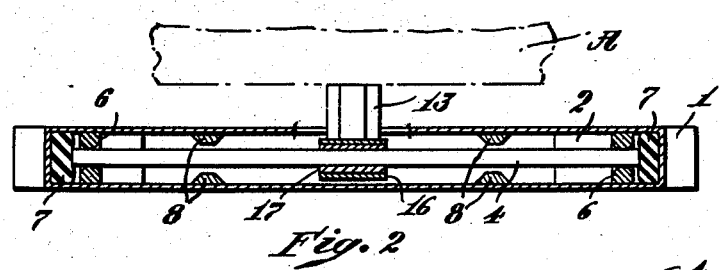
Fig. 2 is a section on line 2—2 of Fig. 1.
Figure 3:
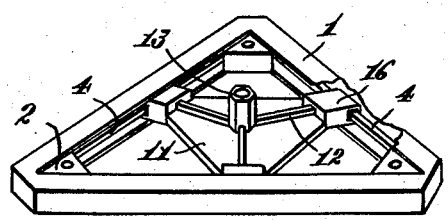
Fig. 3 is an isometric view.

The particular embodiment of the invention shown in Figs. 1 to 3 comprises a triangular base formed of three channel members 1 secured together at the corners with their open sides facing inwardly, and triangular corner pieces 2 brazed to the edges of the channel members, the corner pieces having openings 3 for use in mounting the base on a support. Extending lengthwise in the channel members are beams 4 having their ends supported in bearings 6 fast to the ends of the channel members. In the illustration the beams are rectangular in cross-section and the openings in the bearings 6 are also rectangular in cross-section, the inner surfaces of the bearings being rounded lengthwise of the beams. The bearings may be formed of resilient material such as steel or nylon or slight clearance may be provided between the beams and bearings to permit the beams to tip freely when they are flexed. Disposed in the corners of the bases are rubber cushions 7, the ends of the beams being embedded in these cushions to prevent substantial endwise movement of the beams. Mounted on the inner walls of the channel members 1 are bumpers 8, preferably formed of nylon, hard rubber or other resilient material, to limit the amplitude of vibration of the beams 4.

Disposed within the base is a triangular support 11 having stiffening ribs 12 on its upper surface and an upstanding post 13 provided with a socket 14 to receive the stem of an article A such as an electronic instrument. At the corners the support 11 is provided with bearings 16 slidably mounted on the beams 4 through the medium of sleeves 17. The beams 4 are preferably formed of steel and the sleeves 17 of nylon or other material suitable for use as friction pads.

Figure 4:
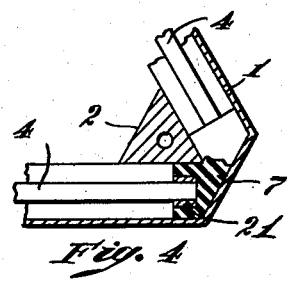
Fig. 4 is a view like Fig. 1 showing a modification.
Figure 10:
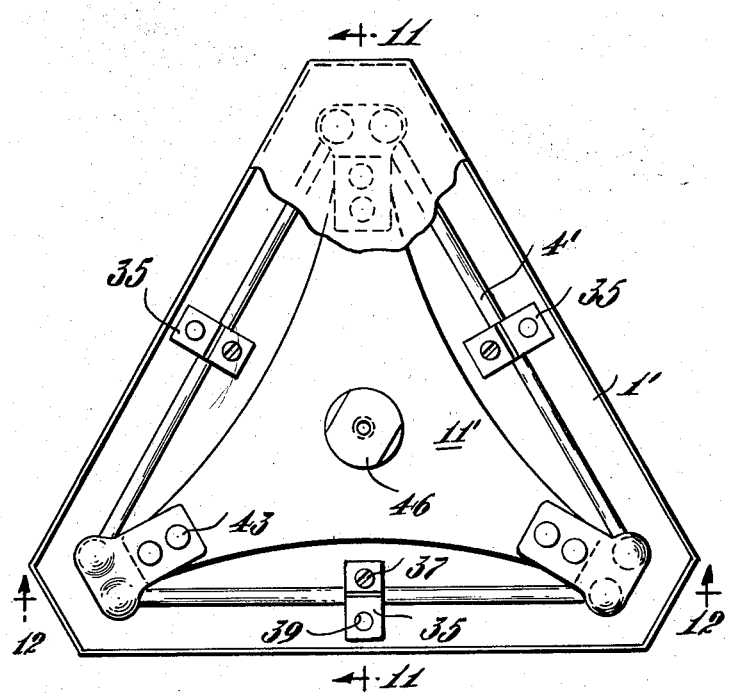
Fig. 10 is a plan view of another triangular embodiment with a part of the cover broken away.

In the modification shown in Fig. 4 the bearings 6 are omitted and the ends of the beams are mounted in the rubber cushions 7 through the medium of sleeves 21 which are fast to the rubber but slide on the beams.

The mount may be used to isolate the article A from vibration of the support upon which the base 1 is mounted or to prevent transmission of vibration from a vibratory device A to the support. In either case the vibration is absorbed largely by flexure of the beams, dampened by the bearings 16 sliding on the beams, and snubbed by the bumpers 8.

Fig. 6 shows one way of using mounts such as shown in Figs. 1 to 3 to support a cylindrical article A having hemispherical ends. Bosses 22 are welded or otherwise screwed to the hemispherical ends for attachment to the mounts by means of machine screws extending through the openings 3 (Fig. 1) in the bases of the mounts and threading into the bosses. The center posts 13 may be mounted on any suitable support or supports.

The modification shown in Fig. 7 differs in that the triangular support 11 with ribs 12 and post 13 of Fig. 1 have been replaced by the three struts 24 and the center part 23. The struts extend obliquely from the beams 4 to the center part. The mounts are supported in the corners of a tray T with the corners of the rectangular article A extending through the bases 1 and resting in recesses in the inner ends of the center parts. As illustrated the corners of the article A engage only the recesses at the inner ends of the center parts and the tray contacts only the apexes of each base 1, the three apexes being spaced equidistantly from a corner of the article A. With this construction the mounts need not be attached to either the article A or the tray T, the lower corners of the article seating in the inner ends of the parts 23 and the apexes of the bases 1 seating against the sides and bottom of the tray T. The mounts consume very little space and require very little clearance between article and tray or other support.

In the modification shown in Figs. 8 and 9 the bases of the mounts have four sides instead of three, two sides 31 disposed in vertical planes and two sides 32 disposed in a horizontal plane, the four sides being equal in length and fast together at the corners as in the preceding embodiment. The center parts 33, corresponding to 13 of Figs. 1 to 3 and 23 of Fig. 7, are shaped to fit in the corners of a tray T and they are interconnected with the beams 4 enclosed by the bases 31 and 32 by means of struts 34. The method of use illustrated in Figs. 8 and 9 provides support for a rectangular article A in the tray T on each of the four sides of the article without the necessity of securing the mounts either to the tray or to the article. However it will be understood that in each of the foregoing embodiments the mounts may be secured either to the article or to the tray or to both. It will also be understood that the bases of the mounts may be secured to the article to be protected from vibration or to the supports for the mounts, for example, the article A to be protected from vibration is mounted on the center parts of Figs. 2 and 7 and in Figs. 6, 8 and 9 the article A to be protected from vibration is mounted on the bases of the mounts.

The basic configuration of the mount provides for a non-linear load-deflection curve whose spring rate increases with increasing load. This is a desirable feature which aids in the proper dissipation of shock loads. The fundamental non-linearity is produced in the plane of the base in that as the load deflects in any direction the transfer point slides along the beams to an off-center position. Since the beam springs are essentially simply-supported beams, their stiffness increases as the load moves away from the center. Any desired additional degree of non-linearity can be afforded by the snubbing blocks 8 which come into contact with the beams at a predetermined deflection. This action increases the stiffness by decreasing the effective length of the beam springs.

The friction damping provided by the friction pads 17 sliding along the beams is characterized in that the friction force is a function of the amplitude of vibration. Thus as the load increases the normal force between pads and beams increases, providing greater friction. The normal force under static loading can be increased by spring-loading the friction pads, thereby increasing the normal pressure.

Figure 11:
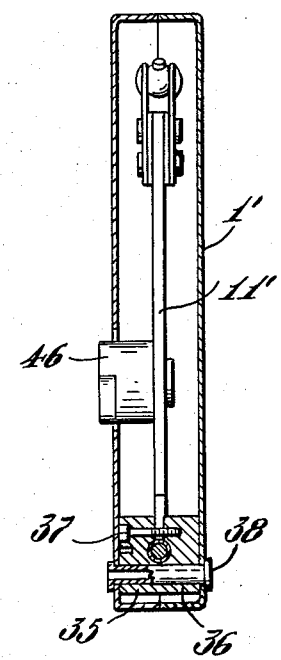
Fig. 11 is a section on line 11—11 of Fig. 10.
Figure 12:
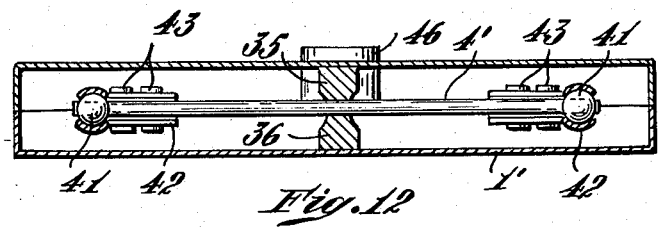
Fig. 12 is a section on line 12—12 of Fig. 10.
Figure 13:
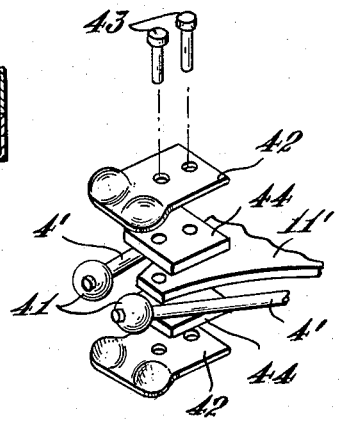
Fig. 13 is an exploded view of the parts interconnecting the ends of the beam with one of the mounts in Figs. 10 to 12.

In the modification shown in Figs. 10 to 13 the two mounts corresponding to 1 and 11 in Figs. 1 to 4 are designated 1' and 11'. In this modification the beams 4' are round in cross-section instead of square and instead of being attached to the mount 1' at their ends they are mounted at their mid points by means of brackets formed in two parts 35 and 36 held together by means of screws 37 which clamp the beams tightly so that the beams cannot slide lengthwise in the brackets. As shown in Fig. 11 the brackets are fastened to the mount 1' by means of hollow rivets 38 extending through openings 39 in the brackets. The mount 1' may be attached to any article or support by means of screws or other fasteners extending through the hollow rivets 38. As shown in Fig. 12 the bracket 35—36 is preferably recessed on each side around the opening for the beam 4' to facilitate flexure of the beam on each side of the bracket.

Slidable on each end of each of the beams 4' is a ball 41. The mount 11' is supported on these balls by means of clamps 42 held together by rivets 43 with spacers 44 between the mount 11' and the clamps 42. The balls 41 may be clamped more or less tightly to vary the friction by interchanging spacers 44 of different thickness, and the rivets 43 may be replaced by machine screws to facilitate the adjustment of the friction of the clamps 42 on the balls 41. The mount 11' is preferably formed of resilient material and the resiliency may be changed by substituting mounts of different thickness or different material or both.

When one of the mounts 1' or 11' vibrates, the beams 4' flex back and forth and slide lengthwise in the balls 41, this flexing being dampened by friction between the balls 41 and the clamps 42. With the beams mounted at the middle, instead of at the ends as in the first embodiment, each beam acts as two beams of half length cantilevered at the mounting bracket 35. The round beams afford easy fabrication and low stress. With round beams the mount has twice the stiffness in the direction perpendicular to its plane as in the plane of the mount. To compensate for this the mount 11' may have sufficient flexibility to equalize the stiffness perpendicular to the plane of the mount 1' with the stiffness along the other two mutually perpendicular axes. By adjusting the tightness with which the clamps 42 engage the balls 41 the vibration of the beams 4' may be adjustably dampened. By locating the load-transfer points at the ends of the beams, a finite torsional stiffness is provided for all angles of rotation of the central mounting post 46. The rotation of the mount 11' about the axis of the post 46 causes all the beams to flex, thereby providing a positive restoring moment. Thus the restoring moment is achieved as soon as the beams begin to flex, thereby affording a high degree of returnability in rotation such as required for gyroscopes and the like.

Figure 14:
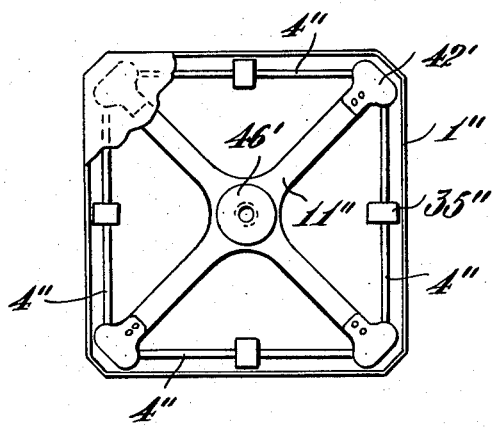
Fig. 14 is a plan view of a rectangular embodiment with a part of the cover broken away.

The modification shown in Fig. 14 comprises four beams 4" arranged in square formation. As in Figs. 10 to 13 the beams are fastened to the mount 1" at their mid points by means of brackets 35'. The other mount 11" is shaped like a cross with a mounting post 46' at the center and with the ends of the cross attached to the ends of the beams by the means shown in Fig. 13 including clamps 42'. Here again the beams are clamped tightly in the brackets 35' with their ends sliding in the balls between the clamps 42'.

In the modification shown in Figs. 15 to 17 only two beams 4''' are employed and they cross at right angles to their mid points. Where they cross they are clamped together by means of two plates 11''' held together by means of screws 47, the abutting faces of the plates having recesses to accommodate the beams 4'''. Here again the ends of the beams are slidable through balls 41' which are frictionally clamped between two clamps 42" corresponding to 42 of Fig. 13. The clamps are held together by screws 48 by which the friction between the balls and clamps may be adjusted. To prevent the beams from becoming displaced accidentally when the screws 47 and 48 are loosened, a screw 49 may be threaded into each end of each beam.

When the beams slide in balls which are frictionally gripped, as in Figs. 10 to 17, the damping of the friction between the balls and clamps is effective predominantly on vibrations transversely of the plane of the base 1', 1" or 1'''.

An essential characteristic of the invention consists in that the beams extend transversely of each other so that sliding movement along one beam flexes another beam. Referring to Fig. 1 for example, shocks may move support 11 parallel to the plane of support 1 in different directions; if perpendicular to one of the beams, support 11 slides on the other two beams as all three flex in said plane; and if in a direction which is not perpendicular to any beam the support slides on all three beams as they flex in said plane. Also if the shock is oblique to said plane all three beams flex and the support slides on the beams in directions which depend on the obliquity of the shock.

Another important characteristic of the invention consists in that there is no coupling between linear and angular motions of the mount. A translational force supplied in any direction to the loading point will cause only linear displacement with no rotation of the loading axes. Stiffness is controlled solely by the material, cross-section and length of the beam springs. The mount can carry very heavy loads without a proportional increase in size. Similarly it can be designed for high accelerations.

From the foregoing it will be evident that the part 1 constitutes a mount adapted to rest on a table or other base and that the part 11 constitutes a mount for a delicate instrument or other article to be protected against vibration or vice versa.

From the foregoing it will also be understood that this invention affords multi-directional vibration absorption in a flat mount, that is a mount having a relatively small dimension in one direction. The multi-directional mount is not limited to high natural frequencies nor is it limited in size of load it can be designed to carry efficiently. It is equally suited for deck, bulkhead or overhead installations. Perhaps the most important feature of the mount is the use of simply-supported beam springs in conjunction with sliding load-transfer points. This feature, together with the geometric arrangement, provides the basic characteristic of decoupled, multi-directional stiffness.

It should be understood that the present disclosure is for the purpose of illustration only and that this invention includes all modifications and equivalents which fall within the scope of the appended claims.

This application is a continuation-in-part of copending application Serial No. 545,664, filed November 8, 1955, now abandoned.

I claim:

1. For mounting an article on a support, a vibration-absorbing device comprising two mounts for engagement with the article and support respectively, a plurality of stiff flexible beams connected to one of said mounts, and means slidably connecting the other mount to said beams, said other mount having surfaces sliding on said beams respectively, the beams extending transversely of each other and said surfaces being fixed in relation to each other so that sliding movement along one beam flexes another beam.

2. A device according to claim 1 wherein the connections between the beams and one of the mounts comprise universal joints at the ends of the beams.

3. A device according to claim 1 wherein three of said beams extend obliquely to each other in the form of a triangle.

4. A device according to claim 1 wherein four of said beams extend approximately at right angles to each other in the form of a rectangle.

5. A device according to claim 1 wherein two of said beams cross each other intermediate their ends.

6. For mounting an article on a support, a vibration-absorbing device comprising two mounts for engagement with the article and support respectively, a plurality of flexible beams fast to one of said mounts and slidably connected to the other mount, the beams extending transversely of each other so that sliding movement along one beam flexes another beam, and means connecting the ends of the beams with said other of the mounts, said means including balls frictionally gripped to afford damping.

7. For mounting an article on a support, a vibration-absorbing device comprising two mounts for engagement with the article and support respectively, a plurality of flexible beams fast to one of said mounts and slidably connected to the other mount intermediate their ends, said other mount having surfaces sliding on said beams respectively, the beams extending transversely of each other and said surfaces being fixed in relation to each other so that sliding movement along one beam flexes another beam, and means connecting the ends of the beams with said other of the mounts, said means including balls frictionally gripped to afford damping.

8. For mounting an article on a support, a vibration-absorbing device comprising two mounts for engagement with the article and support respectively, three flexible beams fast to one of said mounts and slidably connected to the other mount, said other mount having surfaces sliding on said beams respectively, the beams extending obliquely to each other in the form of a triangle and said surfaces being fixed in relation to each other so that sliding movement along one beam flexes the other beams, and means connecting the ends of the beams with said other of the mounts, said means including balls frictionally gripped to afford damping.

References Cited in the file of this patent

UNITED STATES PATENTS

| | | |
|---|---|---|
| 1,536,981 | Stossel | May 5, 1925 |
| 2,415,983 | Yerzley | Feb. 18, 1947 |